United States Patent [19]

Tellier et al.

[11] Patent Number: 4,595,512
[45] Date of Patent: Jun. 17, 1986

[54] PROCESS FOR THE PREPARATION OF MICROEMULSIONS BETWEEN AN ACID PHASE AND A HYRDOPHOBIC PHASE

[75] Inventors: Jacques Tellier, Lons; Jean-Claude Gautier, Billere, both of France

[73] Assignee: Societe Nationale Elf Aquitaine, France

[21] Appl. No.: 533,621

[22] Filed: Sep. 19, 1983

Related U.S. Application Data

[63] Continuation of Ser. No. 254,212, Apr. 15, 1981, abandoned.

[30] Foreign Application Priority Data

Apr. 18, 1980 [FR] France ............................... 80 08750

[51] Int. Cl.$^4$ ............................................. E21B 43/27
[52] U.S. Cl. ............................. 252/8.55 C; 75/0.5 A; 75/84.1 R; 166/307; 252/309; 252/312
[58] Field of Search ...................... 252/8.55 D, 8.55 R, 252/8.55 C, 309, 312; 166/307

[56] References Cited

U.S. PATENT DOCUMENTS

| | | | |
|---|---|---|---|
| 2,356,205 | 8/1944 | Blair et al. ........................... | 252/8.55 |
| 3,254,714 | 6/1966 | Gogarty et al. ............... | 252/8.55 X |
| 3,493,048 | 2/1970 | Jones ..................... | 166/252 |
| 3,754,599 | 8/1973 | Hummel et al. ................ | 166/307 X |
| 3,794,117 | 2/1974 | Knox et al. .................... | 252/8.55 X |
| 3,831,679 | 8/1974 | Presley et al. ...................... | 166/307 |
| 4,255,270 | 3/1981 | Sitton et al. ......................... | 252/8.55 |

Primary Examiner—Herbert B. Guynn
Attorney, Agent, or Firm—Ostrolenk, Faber, Gerb & Soffen

[57] ABSTRACT

The present invention relates to a process for preparing microemulsions between an acid phase and a hydrophobic phase in which a cationic surfactant and a cosurfactant are added to the reaction medium. This process makes it possible to obtain either a microemulsion of acid-in-oil type in equilibrium with an acid phase, or a microemulsion of oil-in-acid type in equilibrium with an organic phase, or a microemulsion in simultaneous equilibrium with the organic and acid phases.

The process is applicable to numerous domains: controlled acidification, stimulatiion of oil-producing well formations, fracturing, liquid-liquid extraction of metal cations in hydrometallurgy, chemical reactions (sulfonation, sulfatation, protonic catalysis).

14 Claims, No Drawings

PROCESS FOR THE PREPARATION OF MICROEMULSIONS BETWEEN AN ACID PHASE AND A HYRDOPHOBIC PHASE

This application is a continuation of application Ser. No. 254,212, filed Apr. 15, 1981, now abandoned.

The present invention relates to microemulsions of acids; it also relates to a process for their preparation and concerns their compositions; it relates more particularly to microemulsions of strong acids and to their use.

Microemulsions are currently under considerable development. This process is of major importance, since, due to the use of a surfactant and a cosurfactant, it permits a considerable reduction of the interfacial tension between an aqueous solution and a hydrophobic phase, thus creating, substantially without stirring, an apparently homogeneous, thermodynamically stable composition in which very fine droplets, of the order of 0.005 to 0.2 micron, of one of the phases, are dispersed.

Commonly known uses of microemulsions are various; they are particularly applied to the following fields: assisted tertiary recovery, detergents, fuels, lubricants, cosmetology, food stuffs, pharmaceuticals, agriculture and the like. Although the field of applications is wide, the number of possible uses of microemulsions is restricted to cases in which the pH is close to neutral. Up to the present time, it has not been possible to obtain heterogeneous phase dispersions of which one of the phases is acid, other than by conventional emulsification of the reaction medium, this requiring powerful stirring means and having the drawback of poor stability of the dispersion when shelved. Microemulsions have not been used for these types of reaction, due precisely to the difficulty in creating a microemulsion between an acid aqueous phase (or pure acid) and a hydrocarbon.

U.S. Pat. No. 3,754,599 describes micellar dispersions constituted by hydrochloric, phosphoric and hydrofluoric acids in which the concentrations of the acid in water are between 0.001 and 10% by weight and preferably between 0.01 and 5% by weight. The surfactants used are petroleum sulfonates. The micellar dispersions proposed have the following proportions:

hydrocarbon: 2 to 70%
aqueous solution: 5 to 95%
surfactant: 4 to 20%
cosurfactant: 0.01 to 20%
electrolyte: 0.001 to 10% with respect to water.

U.S. Pat. No. 3,831,679 describes under comparable conditions micellar dispersions adapted to be injected in oil-producing wells. The compositions are constituted by hydrocarbon, concentrated hydrochloric or hydrofluoric acid, a surfactant of sulfonate type and a cosurfactant:

hydrocarbon: 25 to 75%
concentrated acid: 5 to 10%
surfactant: 10 to 40%
cosurfactant: 5 to 40%

The above compositions have two major drawbacks. Firstly, the acid introduced in the composition is not completely conserved as such since it reacts with the surfactant of sulfonate type; moreover, these formulations are generally accompanied by precipitation of a solid phase rendering them unstable for the majority of the applications envisaged.

The aim of the present invention was therefore to produce thermodynamically stable microemulsions of strong acids, in which the surfactant and the cosurfactant would not react with the acid so that the composition of the starting reaction medium is not modified by the acid-surfactant reaction.

The object of the present invention is to overcome the above problem; said invention enables stable microemulsions to be prepared when the medium to be treated is acid and the concentration of acid of the medium is high, and even when this phase is constituted by pure acid.

The process according to the invention for preparing microemulsions which consists in mixing one or more hydrophobic compounds with acid, a surfactant, a cosurfactant and possibly other adjuvants, is characterized in that the surfactant is a cationic compound inactive with respect to acids.

Among the cationic surfactants which are inactive with respect to acids, and by way of non-limiting examples, the following compounds which are suitable as emulsifiers for obtaining microemulsions of strong acids, may be mentioned: quaternary ammoniums, amino compounds from which quarternary ammoniums are formed, and sulfoniums. Among the quaternary ammoniums the following may be mentioned without this list being limited: mono alkyl trimethyl ammonium salts, dialkyl dimethyl ammonium salts, trialkyl methyl ammonium salts, alkyl benzyl dimethyl ammonium salts, benzyl alkyl ammonium halides, alkyl pyridinium halides, in which the alkyl radical contains 6 to 24 carbon atoms; this latter alkyl radical may be in particular: a capryl, dodecyl, tetradecyl, hexadecyl, octadecyl, cetyl, stearyl, cocoyl, dodecyl-benzyl, dodecyl-phenyl, isohexadecyl, oleyl, palmitoyl radical; it may come from tallow (hydrogenated or not), soya, or copra.

The quaternary ammonium salts may be halides (chloride, bromide), sulfates, perchlorates, phosphates and other salts. Among the amino compounds which are suitable as cationic surfactant compounds, the following may be mentioned: the salts of primary, secondary, tertiary amines of which the alkyl group is identical to that of the quaternary ammoniums described hereinabove: oxyethylated amines such as amines, oxyethylated diamines containing from 2 to 20 ethylene oxide groups, the alkyl groups being the same as those described hereinabove.

Among the sulfonium salts, the following may be indicated: salts of trialkyl sulfoniums, of which at least one of the alkyls contains from 12 to 20 carbon atoms, such as dimethyl sulfonium methosulfonate and methyl dioctadecyl sulfonium hydrogensulfate.

The cosurfactant according to the invention may be chosen from those of the known prior art and particularly from the class of alcohols, ketones, ethers, diols, ethers of glycerol, organic acid salts (sulfonates, sulfates, carboxylate), glyceryl ether sulfonates, alkoamides, phosphoric mono- and diesters, sulfoxides, amines salts, quaternary organic base salts.

The surfactants according to the invention may be applied to the different known hydrocarbons, such as paraffins, olefins, aryl naphthenes and other hydrocarbons, as well as to those which constitute the crude oils or fractions of distillation of the latter; they are also applicable to the hydrocarbons resulting from the distillation of coal.

The acids which are included in the composition of the microemulsions of strong acids according to the invention are inorganic acids such as: hydrochloric, perchloric, sulfuric, oleum, phosphoric, nitric, hydrobromic, hydroiodic, hydrofluoric acids, or complexes of acids such as $H_3PO_4$—$BF_3$; $BF_3$—$H_2O$.

By way of examples, the process according to the invention may be applied to the following: liquid-liquid extraction of metal cations in hydrometallurgy: such a process may be applied for example to the extraction of uranium in concentrated phosphoric acid, or in the solutions used for sulfuric or hydrochloric lixiviation; the microemulsion process allows considerable increase of the interface of the two phases, this leading to an increased speed of extraction of the metals. The process according to the invention also promotes different chemical syntheses such as those which are catalysed by protonic acids: reaction of alkylation (for example alkylation of benzene into ethyl benzene), of hydrolysis (of fatty esters for example), of esterification, of transesterification, of polymerisation, of isomerisation (for example n-butane to isobutane), of carboxylation (for example of isobutene to pivalic acid). The process according to the invention may be applied to polyphase catalysis, to the dispersions of acids in organic solvents (for example simulation of oil-producing wells, particularly for limestone reservoirs). The invention may also be applied to chemical reactions between the acid and organic products such as sulfonation and sulfatation.

Contrary to what is suggested in U.S. Pat. Nos. 3,467,188, 3,474,865 and 3,754,599, the strong acids do not behave, from the point of view of the obtention of microemulsions, as simple electrolytes such as for example sodium chloride. In fact, when the ionic force increases, and in the presence of an insufficient quantity of cosurfactants for obtaining a single microemulsion phase, one passes successively, in the case of mineral salts, from a system constituted by a microemulsion in the aqueous phase in equilibrium with the hydrophobic compound (system I according to the terminology introduced by WINSOR and described for example in "Solvent Properties of Amphiphilic Compounds", published by Butterworths, London, 1954), to a system constituted by a microemulsion in simultaneous equilibrium with the hydrophobic compound and the aqueous phase (system III according to WINSOR); then for high salinities, to a system constituted by an oil-in-water microemulsion in equilibrium with the aqueous phase (system II according to WINSOR).

In the case of the systems proposed according to the invention, a strictly opposite behaviour is observed, namely that, beyond a concentration of acid in the order of 1%, acid-in-oil type microemulsions in equilibrium with the acid (system II) are obtained, then, when the concentration of acid increases, microemulsions of acid in simultaneous equilibrium with the hydrophobic compound and the aqueous phase are obtained, then, for higher concentrations of acid oil-in-acid type microemulsions in equilibrium with the oily phase are obtained.

These observations clearly indicate that the rules of formulation of the microemulsions being applied to the conventional electrolyte solutions cannot be applied with success for obtaining microemulsions of concentrated inorganic acids.

Depending on the fields of application, the types of reaction and the desired result, it is advantageous to use either a microemulsion of acid dispersed in oil in equilibrium with an acid phase (WINSOR II), a microemulsion of oil in acid in equilibrium with an organic phase (WINSOR I), or a microemulsion in simultaneous equilibrium with the organic phase and the acid phase (WINSOR III).

The obtention of these different types of microemulsions depends on the nature and proportions of their components. The natures and quantities of oil, acid, surfactants and cosurfactants required for obtaining microemulsions of acids are critical. For given conditions (nature of the hydrocarbon, of the surfactant and of the cosurfactant, temperature, . . . ), there is an optimal acid concentration for the obtention of microemulsions with minimum quantities of surfactant. Similarly, for an acid of given nature and concentration, it is possible to choose the nature of the surfactant and/or of the cosurfactant, or the nature of the hydrocarbon in order to obtain a microemulsion using a minimum quantity of surfactant.

The hydrocarbon is an organic compound insoluble in water to be dispersed with the acid; it is characterised by the number of atoms of carbon of the alkane equivalent (NCAE).

The optimal force of the acid enabling the microemulsions to be obtained depends on the following parameters: the nature of the hydrocarbon characterised by its alkane equivalent, the nature and the concentration of the surfactant, the nature of the acid, the nature and concentration of the cationic surfactant, the temperature, and the relative proportions between the acid and the hydrophobic compound.

It is not possible to indicate, a priori, the quantity of surfactant to be used in each case; the microemulsions according to the invention may be made in a wide range of more or less acid water/hydro carbon proportion. The invention enables microemulsions to be obtained, containing small quantities of surfactants and cosurfactants in a wide range of acidities of from 1% by weight of strong inorganic acid to pure acid and even acid enriched with acid anhydrides such as oleums or phosphoric acids enriched with $P_2O_5$.

For an acid of given nature and concentration, a cationic surfactant-cosurfactant couple may be found for each hydrophobic compound characterised by the number of carbon atoms of the alkane equivalent (NCAE), said couple enabling microemulsions to be obtained by using minimum quantities of surfactants.

It has been shown within the scope of the present invention that there is a linear relation between the logarithm of the concentration of the optimal acidity and the number of carbon atoms of the alkane equivalent (NCAE), the nature and concentration of the surfactant agent, the nature and concentration of the alcohol used as surfactant.

For the same family of cationic surfactants, the molecular mass plays a large role. It is included between 250 and 800 and preferably between 350 and 600 in the case of non-ethoxylated surfactants. It may be greater than these values in the case of ethoxylated or propoxylated surfactants.

The following non-limiting examples illustrate the easy obtention, according to these rules, of microemulsions of strong acids in a very wide range of concentrations.

These examples are constituted by series of preparations of microemulsions in which the natures of the surfactant, of the cosurfactant, of the hydrophobic compound and of the acid are varied. They show that a concentrated acid requires, for obtaining a microemulsion, the use of a surfactant which is lipophilic or of a higher molecular mass for the same structure, or a more hydrophobic cosurfactant than an acid of lower concentration. To obtain a microemulsion with a more dilute acid, a hydrocarbon must be used whose alkane equivalent is greater than that used for obtaining a microemulsion with a less dilute acid.

EXAMPLE 1

4.2 g of phosphoric acid titrating 43% of $H_3PO_4$ and 4.1 g of heptane are mixed at 20° C. with slight stirring; by adding 0.52 g of tetradecyltrimethyl ammonium bromide as surfactant and 1 g of 2-ethyl hexanol as cosurfactant a microemulsion is obtained.

EXAMPLE 2

2 g of phosphoric acid titrating 22% of $H_3PO_4$ and 2 g of tetradecane are mixed at 20° C. with slight stirring; by adding 2.25 g of oxyethylene monoamine containing 11 ethylene oxide groups (marketed commercially under the name of NORAMOX S11 ® by the firm CECA) and 2.25 g of isopentanol, a microemulsion is obtained.

EXAMPLE 3

10 g of $P_2O_5$ are dissolved in 100 g of concentrated phosphoric acid. 2 g of this acid preparation and 2 g of decane are dispersed in the form of microemulsions after the addition of 1.1 g of dimethyl distearylammonium chloride used as surfactant and of 1.1 g of 2-ethyl hexanol used as cosurfactant.

EXAMPLE 4

A microemulsion is obtained by mixing, at 20° C. with slight stirring, 18.3% of an aqueous solution of hydrofluoric acid titrating 17.5% by weight, 46.9% of gas oil, 17.4% of tetradecyltrimethyl ammonium chloride and 17.4% of 2-ethyl hexanol.

EXAMPLES 5 TO 10

The results of the following Table were obtained by mixing at 20° C. with slight stirring, an aqueous solution of hydrochloric acid, titrating 0.15 by weight, dodecane, cetyl trimethyl ammonium bromide as surfactant and a mixture of 2-ethyl hexanol and isobutanol as cosurfactant. The weight ratio acidulated water/dodecane is equal to 4; the weight ratio cosurfactant/surfactant is equal to 1. The ratio of the cosurfactants 2-ethyl hexanol/isobutanol is varied and the Table indicates the quantity in % by weight of surfactant (therefore that of cosurfactant) for obtaining a stable microemulsion under the best operating conditions.

TABLE I

|  | Ex. 5 | Ex. 6 | Ex. 7 | Ex. 8 | Ex. 9 | Ex. 10 |
|---|---|---|---|---|---|---|
| 2-ethyl hexanol isobutanol | 0 | 0.5 | 1 | 2 | 3 | 4 |
| Surfactant % weight of cetyl trimethyl ammonium | 18.3 | 9.1 | 6.5 | 4.9 | 6.1 | 21.1 |

From this Table, it is observed that the choice of the concentrations and the relative ratio of the cosurfactants have a considerable influence on the proportions of surfactants which must be introduced to obtain stable microemulsions.

EXAMPLE 11

5.5 g of hydrochloric acid titrating 15% by weight of HCl are mixed with 15 g of gas oil in the presence of 2.8 g of tetradecyl trimethyl ammonium bromide, 0.94 g of 2-ethyl hexanol and 3.3 g of dodecanol. A microemulsion is obtained which is stable between 0° and 100° C.

EXAMPLE 12

The operations conditions are the same as those of the preceding examples, using:

5 g of hydrochloric acid titrating 15%
15 g of gas oil
20 g of tetradecyl trimethyl ammonium bromide
2.35 g of 2-etnyl hexanol and
1.06 of decanol The emulsion obtained is stable between 50° and 60° C.

EXAMPLE 13

2 g of 18N sulfuric acid and 2 g of decane are mixed with 3.85 g of 2-ethyl hexanol and 3.8 g of distearyl dimethyl ammonium chloride. The product obtained is in the form of a stable emulsion.

EXAMPLE 14

3.2 g of oleum with 25% of $SO_3$, 3.2 g of decane, 2.1 g of distearyl dimethyl ammonium chloride as used as surfactant and 2.1 g of 2-ethyl hexanol used as surfactant are mixed, with slight stirring. A stable microemulsion is obtained.

EXAMPLE 15

This example shows that the couple $H_3PO_4$—$BF_3$-$H_2O$ which is a Lewis acid catalyst used for reactions such as alkylation, isomerisation, carbonylation, etc . . . can be formed as microemulsions. 1.6 g of a mixture constituted by 21% by weight of $H_3PO_4$, 55% of $BF_3$ and 24% of water, are added to 1.6 g of heptane. This mixture is transformed into microemulsion by the addition, with slight stirring, of 2.7 g of dialkyl dimethyl ammonium chloride (marketed under the name NORAMIUM M 14 ® by the firm CECA), as surfactant, and 1.3 g of isobutanol as cosurfactant, the average number of carbon atoms of the dialkyl being 14.

EXAMPLES 16 TO 22

Influence of the acidity

These examples indicate the quantities of surfactant which must be used as a function of the acid content of the medium. The results show that this quantity is not proportional to the acid content, but that there is a point of optimal acidity.

The tests are carried out under the following conditions: sulfuric acid is mixed at a temperature of 20° C. with heptane, and dialkyl dimethyl ammonium chloride NORAMIUM M 14 ® (CECA) as surfactant and isobutanol as cosurfactant are added. The weight ratio $H_2SO_4$/heptane is equal to 1, that of the cosurfactant/surfactant is equal to 5. The titre of sulfuric acid is varied.

TABLE II

| TESTS | 16 | 17 | 18 | 19 | 20 | 21 | 22 |
|---|---|---|---|---|---|---|---|
| acid content: % by weight | 0 | 25 | 40 | 50 | 65 | 75 | 100 |
| % by weight of surfactant in the microemulsion | 34.5 | 34.1 | 28.3 | 25.2 | 32.8 | 34.6 | 37.2 |

EXAMPLES 23 TO 27

Influence of the HC/acid ratio

The purpose of these examples is to study the influence of the hydrocarbon/acid ratio on the quantity of the surfactant to be added to obtain a microemulsion. It is observed that oil-in-acid microemulsions are transformed continuously into acid-in-oil microemulsions.

The tests are carried out under the following conditons: hydrochloric acid titrating 0.15 by weight and dodecane are mixed at a temperature of 20° C.; cetyl trimethyl ammonium bromide as surfactant and a mixture of 2-ethyl hexanol and of isobutanol as cosurfactant are added. The ratio of surfactant/cosurfactant by weight is equal to 1 and the ratio isobutanol/2-ethyl hexanol by weight is equal to ⅓. The acid/dodecane ratio is varied.

The results are indicated in the following Table:

TABLE III

| TESTS | 23 | 24 | 25 | 26 | 27 |
|---|---|---|---|---|---|
| acid/dodecane | 0.05 | 0.42 | 1 | 2 | 10· |
| % of surfactant to be added to obtain a microemulsion | 5.6 | 9.7 | 10 | 7.1 | 3.4 |

EXAMPLES 28 TO 32

The purpose of these examples is to show that, if a surfactant system (surfactant and cosurfactant) and an acid concentration are chosen, there is a preferred hydrocarbon enabling microemulsions to be obtained with a minimum quantity of surfactant.

At 20° C., aliphatic hydrocarbons are emulsified with phosphoric acid titrating 38.5% of phosphoric anhydride in the ratio 1/1 with the aid of a 1/1 mixture of isobutanol and NORAMIUM M 14 ® (CECA) and the minimum quantity necessary for obtaining a microemulsion is noted.

TABLE IV

| TESTS | 28 | 29 | 30 | 31 | 32 |
|---|---|---|---|---|---|
| Alkane | OCTANE | DECANE | DODECANE | TETRADECANE | HEXADECANE |
| % of surfactant to be added to obtain a microemulsion | 21.3 | 19.2 | 22.5 | 27 | 30.2 |

EXAMPLES 33 TO 36

The following examples show that microemulsions of acids may be obtained with quaternary ammoniums comprising one or more fatty chains.

At 20° C., a 1/1 mixture of tetradecane and of phosphoric acid titrating 46.2% of $P_2O_5$ is emulsified with the aid of a 1/1 mixture of isopentanol and of quaternary ammonium and the minimum quantity of surfactant necessary for obtaining a microemulsion is noted.

TABLE V

| TESTS | QUATERNARY AMMONIUM | % of surfactant to be added to obtain the microemulsion |
|---|---|---|
| 33 | alkyl trimethyl ammonium chloride NORAMIUM M₂C (M = 460) alkyl = having an average number of C of 12 | 25.3 |
| 34 | hexadecyl benzyl dimethyl ammonium chloride (M = 414) | 25.3 |
| 35 | lauryl benzyl dimethyl ammonium bromide (M = 358) | 31.8 |
| 36 | trioctyl methyl ammonium chloride (M = 406) | 37.3 |

EXAMPLES 37 TO 40

These examples describe conditions for obtaining systems of type II according to WINSOR in which a microemulsion of acid in the hydrophobic compound is in equilibrium with the acid phase.

EXAMPLE 37

55 g of phosphoric acid with 34.5% of $P_2O_5$ are mixed with 10 g of dodecane in the presence of 17.5 g of isobutanol and 17.5 g of cationic surfactant NORAMIUM M2C ® sold by CECA.

At equilibrium is obtained an upper phase (80 g), consisting in a microemulsion of hydrochloric solution in dodecane, and a lower phase (20 g) which is a solution of acid in water.

EXAMPLE 38

200 g of phosphoric acid with 31% of $P_2O_5$ are mixed with 40 g of kerosene in the presence of 1.2 g of diethyl-2 hexyl of phosphoric ester, 5 g of decanol and 5 g of dimethyl lauryl benzyl ammonium bromide as surfactant. The biphase system obtained at 50° C. is constituted by 81 ml of a microemulsion in equilibrium with 124 ml of an aqueous phase.

EXAMPLE 39

200 g of phosphoric acid titrating 31% of $P_2O_5$ are mixed with a solution of 0.2 g octyl (OPPA) pyrophosphoric ester in 40 g of kerosene in the presence of 5 g of tricapryl methylammonium chloride and 5 g of 2-ethyl hexyl. At 50° C., two phases in equilibrium are obtained. The lower acid layer occupies a volume of 138 ml whilst the microemulsion of the upper part occupies 66 ml.

EXAMPLE 40

By mixing 3 g of phosphoric acid with 50.6% of $P_2O_5$ with 3 g of decane in the presence of 1.35 g of 2-ethyl hexanol, and 0.65 g of cetyl trimethyl ammonium bromide, a microemulsion is formed in the upper phase (8.2 ml) in equilibrium with the lower phase (0.1 ml).

EXAMPLES 41 TO 43

Microemulsion in equilibrium with an organic phase (system I according to the WINSOR terminology).

EXAMPLE 41

3 g of pure phosphoric acid and 3 g of decane are mixed with 13.5 g of 2-ethyl hexanol and 0.65 g of NORAMIUM M2C® (CECA). The upper organic phase (2 ml) and the microemulsion forming the lower phase (6.6 ml) are in equilibrium.

EXAMPLE 42

8.5 g of 80.7% sulfuric acid, 8.5 g of octane, 0.75 g of isopentanol and 0.75 g of NORAMIUM M2C® (CECA) are mixed. An upper organic phase (11.5 ml) and the microemulsion forming the lower phase (7.5 ml) are in equilibrium.

EXAMPLE 43

3 g of phosphoric acid with 36% of $P_2O_5$, 3 g of decane are mixed with 1.35 g of 2-ethyl hexanol and 0.65 g of cetyl trimethyl bromide.

Two phases are observed:
upper: organic 1.3 ml
lower: microemulsion 7.6 ml

EXAMPLES 44 TO 46

Microemulsion in simultaneous equilibrium with an acid phase and an organic phase (system II according to WINSOR terminology).

EXAMPLE 44

The following is mixed:
200 g $H_3PO_4$ with 31% of $P_2O_5$
40 g of kerosene
1.2 g di-ethyl-2-hexyl of phosphoric ester
3.0 g decanol
2.0 g 2-ethyl hexanol
5.0 g BR 1244 (SEPPIC)

At 50° C., the following is obtained in equilibrium:
a lower acid layer: 110 ml
an intermediate layer (microemulsion): 49 ml
an upper organic layer: 52 ml

EXAMPLE 45

5 g of a 12% by weight hydrochloric acid are mixed with 5 g of octane and 0.30 g of isopentanol and 0.30 g of NORAMIUM M2C® (CECA). An immediate phase (microemulsion) of 1.2 ml is observed.

EXAMPLE 46

5 g of a 78.4% by weight sulfuric acid are mixed with 5 g of octane and 0.25 of isopentanol and 0.25 g of NORAMIUM M2C® (CECA). An intermediate phase (microemulsion) of 1.1 ml is observed.

The surfactants according to the invention may also be applied to all organic hydrophobic compounds and to petrochemical products as for example: chlorinated paraffins; they may be applied as hydrophobic compounds for oils of vegetal or animal origin.

EXAMPLE 47

A microemulsion of acid effective for attacking depositing of calcareous sediments impregnated of hydrocarbons is obtained by mixing
10 parts hydrochloric acid titrating 38%
20 parts 1-1-1 Trichloro-ethane
3.8 parts tertiary amine (NORAMIUM, DMC by the Firm CECA)
0.85 parts 2-ethyl hexanol
0.85 parts isobutanol

EXAMPLE 48

A microemulsion of acid effective for attacking depositing of calcareous sediments impregnated of hydrocarbons is obtained by mixing
20% hydrochloric acid titrating 28%
40% 1-1-1 trichloro ethane
16% Noramium O,85 (by the Firm CECA)
12% 2-ethyl hexanol
12% isobutanol.

What is claimed is:

1. A process for preparing a thermodynamically stable microemulsion of a strong acid phase, said strong acid being an inorganic acid or an acid complex selected from $H_3PO_4BF_3$ and $BF_3H_2O$ and a hydrocarbon or trichloroethane phase, one of said phases in the microemulsion being droplets of 0.0005–0.2 micron, said strong acid phase being said strong acid or aqueous strong acid having an acid concentration of at least 15% by weight comprising mixing said hydrocarbon or trichloroethane phase with said acid phase, a cationic quaternary ammonium salt surfactant and an alcohol cosurfactant such that the quantity of acid in the resulting microemulsion is 2.9 to 32.2% by weight and the weight ratio of cosurfactant to surfactant is 0.5–1.9.

2. The process of claim 1, wherein the quaternary ammonium salt is selected from the group consisting of halide, sulfate, perchlorate and phosphate salts.

3. The process of claim 1, wherein the acid phase is constituted by an inorganic acid selected from the group consisting of hydrochloric, perchloric, sulfuric, oleum, phosphoric, nitric, hydrobromic, hydriodic and hydrofluoric acid.

4. The process of claim 1, wherein said strong acid phase is said non-aqueous strong acid.

5. The process of claim 1, wherein the quantity of said surfactant in said microemulsion is 4.9–37.5% by weight.

6. The process of claim 1, wherein said strong acid phase is said aqueous strong acid and has an acid concentration of 15 to 76%.

7. The process of claim 1, wherein said hydrocarbon is selected from the group consisting of kerosene, gas oil, trichloroethane, heptane, octane, decane, dodecane, tetradecane and hexadecane.

8. A thermodynamically stable microemulsion comprising a strong acid phase wherein said strong acid is an inorganic acid or an acid complex selected from $H_3PO_3BF_3$ and $BF_3H_2O$, a hydrocarbon or trichloroethane phase, a cationic quaternary ammonium salt surfactant and an alcohol cosurfactant, said strong acid phase being said strong acid or aqueous strong acid having an acid concentration of at least 15% by weight, the quantity of strong acid in said microemulsion being 29 to 32.2% by weight and the weight ratio of cosurfactant to surfactant being 0.5–1.9, one of said strong acid and hydrocarbon phases being droplets of 0.005–0.2 micron.

9. The thermodynamically stable microemulsion of claim 8 wherein said strong acid is selected from the group consisting of hydrochloric, perchloric, sulfuric, oleum, phosphoric, nitric, hydrobromic, hydriodic and hydrofluoric acids.

10. The thermodynamically stable microemulsion of claim 9 wherein said strong acid phase is said non-aqueous strong acid.

11. The thermodynamically stable microemulsion of claim 10 wherein the quantity of said surfactant in said microemulsion is 4.9–37.5% by weight.

12. The thermodynamically stable microemulsion of claim 9 wherein said strong acid phase is said aqueous strong acid and has an acid concentration of 15 to 76% by weight.

13. The thermodynamically stable microemulsion of claim 10 wherein said hydrocarbon is selected from the group consisting of kerosene, gas oil, trichloroethane, heptane, octane, decane, dodecane, tetradecane and hexadecane.

14. In a method of acidizing oil producing formations employing an acidizing composition, the improvement which comprises employing the microemulsion of claim 8 as said acidizing composition.

* * * * *